United States Patent
Gorges et al.

(10) Patent No.: US 10,288,113 B2
(45) Date of Patent: May 14, 2019

(54) SLIDING BEARING WITH WEAR DETECTION

(71) Applicants: Mahle Engine Systems UK Ltd, Warwickshire (GB); Mahle International GmbH, Stuttgart (DE)

(72) Inventors: Roger Gorges, Birmingham (GB); David Latham, Hitchin (GB); Stuart Dickson, Wellingborough (GB)

(73) Assignees: Mahle Engine Systems UK Ltd. (GB); Mahle International GmbH (DE)

( * ) Notice: Subject to any disclaimer, the term of this patent is extended or adjusted under 35 U.S.C. 154(b) by 505 days.

(21) Appl. No.: 14/997,482

(22) Filed: Jan. 15, 2016

(65) Prior Publication Data

US 2016/0208849 A1 Jul. 21, 2016

(30) Foreign Application Priority Data

Jan. 16, 2015 (GB) .................................. 1500714.9

(51) Int. Cl.
| F02B 77/08 | (2006.01) |
| F16C 17/24 | (2006.01) |
| F16C 9/02 | (2006.01) |
| F16C 33/20 | (2006.01) |
| G01K 7/02 | (2006.01) |

(Continued)

(52) U.S. Cl.
CPC ............ F16C 17/246 (2013.01); F02D 35/02 (2013.01); F16C 9/02 (2013.01); F16C 17/243 (2013.01); F16C 33/205 (2013.01); F16C 33/208 (2013.01); G01K 7/026 (2013.01); G01K 7/16 (2013.01); G01L 5/0014 (2013.01); G01L 5/0019 (2013.01); G01L 9/0072 (2013.01); F16C 17/022 (2013.01);

(Continued)

(58) Field of Classification Search
CPC .... F16C 17/246; F16C 19/522; F16C 19/525; F16C 33/208; F16C 2233/00; G01L 1/18; G01L 1/22; G01L 5/009; G01P 3/443
USPC ............................... 123/198 D; 384/282, 448
See application file for complete search history.

(56) References Cited

U.S. PATENT DOCUMENTS

| 3,102,759 A | * | 9/1963 | Stewart | .................... B61F 15/02 |
| | | | | 384/276 |
| 6,050,727 A | * | 4/2000 | Messmer | ................ F16C 17/03 |
| | | | | 384/117 |

(Continued)

FOREIGN PATENT DOCUMENTS

| CN | 1932856 A | 3/2007 |
| CN | 104272080 A | 1/2015 |

(Continued)

OTHER PUBLICATIONS

English Abstract of JP 2014-163428-A.

(Continued)

*Primary Examiner* — Marguerite J McMahon
*Assistant Examiner* — James J Kim
(74) *Attorney, Agent, or Firm* — Fishman Stewart PLLC

(57) ABSTRACT

A sliding bearing and a method for its manufacture are disclosed. The sliding bearing may include a metallic substrate, an electrically insulating layer on the metallic substrate, and an electrical component on the electrically insulating layer. The sliding bearing may be operatively connected to a monitoring module configured to monitor the electrical component.

19 Claims, 9 Drawing Sheets

(51) Int. Cl.
*G01K 7/16* (2006.01)
*F02D 35/02* (2006.01)
*G01L 9/00* (2006.01)
*G01L 5/00* (2006.01)
*F16C 17/02* (2006.01)
*G01L 1/14* (2006.01)

(52) U.S. Cl.
CPC ........ *F16C 33/206* (2013.01); *F16C 2233/00* (2013.01); *G01L 1/142* (2013.01)

(56) References Cited

U.S. PATENT DOCUMENTS

| | | | |
|---|---|---|---|
| 6,324,899 B1 * | 12/2001 | Discenzo | F16C 19/52 340/631 |
| 2002/0030482 A1 * | 3/2002 | Iwamoto | G01P 3/443 324/174 |
| 2002/0054719 A1 * | 5/2002 | Takizawa | F16C 19/525 384/448 |
| 2003/0113979 A1 * | 6/2003 | Bieck | H01L 21/76898 438/411 |
| 2004/0031311 A1 * | 2/2004 | Meyer | F16C 17/24 73/7 |
| 2005/0212030 A1 * | 9/2005 | Mussig | H01L 21/28185 257/310 |
| 2007/0058893 A1 | 3/2007 | Patzelt | |
| 2009/0223083 A1 * | 9/2009 | LeCrone | F16C 17/02 34/524 |
| 2015/0168241 A1 | 6/2015 | Gierl et al. | |

FOREIGN PATENT DOCUMENTS

| | | | |
|---|---|---|---|
| GB | 2192949 A * | 1/1988 | ........... B63H 23/321 |
| GB | 2192949 A | 1/1988 | |
| JP | 2010281355 A | 12/2010 | |
| JP | 2014-74641 A | 4/2014 | |
| JP | 2014-163428 A | 9/2014 | |
| WO | WO-2010/066396 A1 | 6/2010 | |

OTHER PUBLICATIONS

European Search Report 15195637.2, dated May 27, 2016.
English abstract for JP-2010281355.
CN Office Action for CN201510958635.7, dated Sep. 3, 2018.
English abstract for JP-2014-74641.
Peeken et al., Moderne Messtechnik mittels aufgedampfter Geber in Gleit- und Waelzlagern, Konstruktion 32 (1980) H. 6, S. 241-246.
European Office Action dated Jul. 4, 2018 related to corresponding European Patent Application No. 15195637.2.

* cited by examiner

SLIDING BEARING WITH WEAR DETECTION

CROSS-REFERENCE TO RELATED APPLICATIONS

This application claims priority to British Patent Application No. 1500714.9, filed Jan. 16, 2015, the contents of which are hereby incorporated by reference in its entirety.

TECHNICAL FIELD

The present invention relates to sliding bearings, and in particular to bearing shells, thrust washers, bearing bushes and bearing shell flanges for sliding bearings in the bearing assemblies of internal combustion engines.

BACKGROUND

In internal combustion engines, main crankshaft bearing assemblies typically each comprise a pair of half bearings retaining a crankshaft that is rotatable about an axis. Each half bearing is a hollow generally semi-cylindrical bearing shell and, typically in crank shaft journal bearing assemblies, at least one bearing shell is a flange half bearing, in which the bearing shell is provided with a generally semi-annular thrust washer extending outwardly (radially) at each axial end. In some flange half-bearings, a single-piece construction of the bearing shell and thrust washers is used, whilst in other half-bearings, the bearing shell and the thrust washer are loosely mechanically engaged with clip-like features, and in a further type of half-bearing the thrust washers are permanently assembled onto the bearing shell by deformation of engagement features. In other bearing assemblies it is also known to use an annular (circular) thrust washer.

Bearing bushes are used at the small end of a connecting rod, to connect the connecting rod onto the piston pin (also known as a gudgeon pin or wrist pin). Bearing bushes may also be used elsewhere in an engine. Bearing bushes are hollow cylindrical bearing liners, that may be solid sleeve bushes, split bushes (in which a strip is formed into a cylinder with butt-jointed ends) or clinch bushes (like split bushes, additionally provided with mutual engagement features on the ends of the strip).

Known bearing shells, thrust washer and bearing shell flanges have a layered construction, in which a substrate comprising a strong backing material is coated with one or more layers having preferred tribological properties to provide a bearing surface that faces a cooperating moving part, e.g. a crankshaft journal, in use. In known bearing shells, a substrate comprises a backing coated with a lining layer, and the substrate is in turn coated with an overlay layer.

The strong backing material may be steel, having a thickness of about 1 mm or more. A known lining layer may be a copper-based material (e.g. copper-tin bronze) or an aluminium-based material (e.g. aluminium or aluminium-tin alloy), which is adhered to the substrate (either directly to the backing or to an optional interlayer). The thickness of the lining layer is generally in the range from about 0.05 to 0.5 mm (e.g. 300 µm of copper-based alloy consisting of 8% wt Sn, 1% wt Ni, and balance of Cu, apart from incidentally impurities). The overlay layer may be 6 to 25 µm of a plastic polymer-based composite layer or a metal alloy layer (e.g. a tin-based alloy overlay).

Known bearing bushes comprise a strong steel backing layer and a lining layer on the backing layer, which provides the running surface for the journal (e.g. gudgeon pin/wrist pin) rotatably held in the bearing.

WO2010066396 describes a plastic polymer-based composite material for use as a bearing overlay layer on a copper- or aluminium-based lining layer, which is in turn bonded onto a steel backing. The described overlay layer comprises a matrix of a polyamide-imide plastic polymer material, having particulate distributed throughout the matrix.

Fuel-saving operating schemes have become popular for automotive engines, which increase the frequency with which the engine is started. Under a "stop-start" operating scheme, stopping and restarting vehicle movement also leads to the engine being stopping and restarted again. Under a "hybrid" operating scheme, the engine is turned off when the vehicle can be powered by an alternative power source, commonly being electrically powered. Whilst engine bearings are typically designed to last the life of the automotive vehicle, the greater frequency with which the engine is started under such operating schemes places an increased demand upon the performance of the sliding bearings by increasing the frequency with which bearing surfaces of the bearing shells, thrust washers and bearing bushes contact the journals of the crankshaft and gudgeon pin, and contact the counterfaces of the associated crankshaft web. However, increased contact causes correspondingly increased wear of the running surfaces of the bearing shells, thrust washers and bearing bushes.

SUMMARY

According to a first aspect, there is provided a sliding bearing comprising: a metallic substrate; a first electrically insulating layer on the metallic substrate; and an electrical component on the first electrically insulating layer.

According to a second aspect, there is provided a sliding bearing monitoring system, comprising a sliding bearing according to any preceding claim and a monitoring module configured to monitor the electrical component and to operate an alarm and/or deactivate the operation of an engine within which the sliding bearing is housed, in correspondence with a measurement of the electrical component.

According to a third aspect, there is provided a method of manufacturing a sliding bearing comprising: a metallic substrate; a first electrically insulating layer on the metallic substrate; and an electrical component on the first electrically insulating layer, the method comprising: depositing an electrical component onto a first electrically insulating layer, the first electrically conductive layer being on a metallic substrate.

The electrical component may extend circumferentially at least partially around the bearing shell.

The electrical component may comprise a resistor.

The resistor may be a resistance temperature detector. The resistance temperature detector may comprise an electrical element of platinum, nickel or copper.

The electrical component may comprise a thermocouple.

The electrical component may comprise a continuity monitoring element.

The electrical component may comprise a dielectric material on the first electrically insulating layer.

The electrical component may comprise a capacitor.

The electrical component may comprise a pressure sensor.

The electrical component may comprise a strain sensor.

The electrical component may comprise a semiconductor material on the first electrically insulating layer.

The electrical component may comprise a transistor.

The transistor may comprise a source electrode and a drain electrode in the semiconductor layer, and a gate electrode on an active region between the source and drain electrodes.

A plurality of electrical components may be provided, axially spaced across the bearing shell.

The electrical component may comprise a plurality of electrically isolated conductive pads between the first and second electrically insulating layers.

The electrically isolated conductive pads may comprise at least two pads of different thickness that are configured to become exposed after different levels of wear of the second electrically insulating layer proximate to each pad.

The electrically isolated conductive pads may comprise at least two pads of the same thickness that are configured to become exposed after substantially equal levels of wear of the second electrically insulating layer proximate to each pad.

The sliding bearing may comprise a radio-frequency identification tag that is electrically connected to the electrical component.

The sliding bearing may comprise a second electrically insulating layer on the first electrically insulating layer.

The bearing shell may comprise an adhesion promotion provided between the electrical component and an electrically insulating layer.

The first electrically insulating layer may extend across the whole of the metallic substrate. Alternatively, the first electrically insulating layer may comprise a patterned layer that is patterned in correspondence with the electrical component.

The sliding bearing may comprise a plurality of electrical components. The plurality of electrical components may be identical, or may be of more than one type. The plurality of electrical components may be electrically connected together in an electrical circuit.

The sliding bearing may comprise a bearing shell, thrust washer, bearing bush or a bearing shell flange.

The electrical component may be deposited by printing.

The electrical component may be deposited by adhering a flexible electronic insert onto the first electrically insulating layer.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having one or more of: increments of integer multiples of 100; and suffix letters; and typographical marks (e.g. primes). For example, in different figures, 100, 100', 200, 300, 400, 500, and 700 have been used to indicate a bearing shell, and 600, 600' and 700' have been used to indicate a blank for a bearing shell.

Figure 1A:
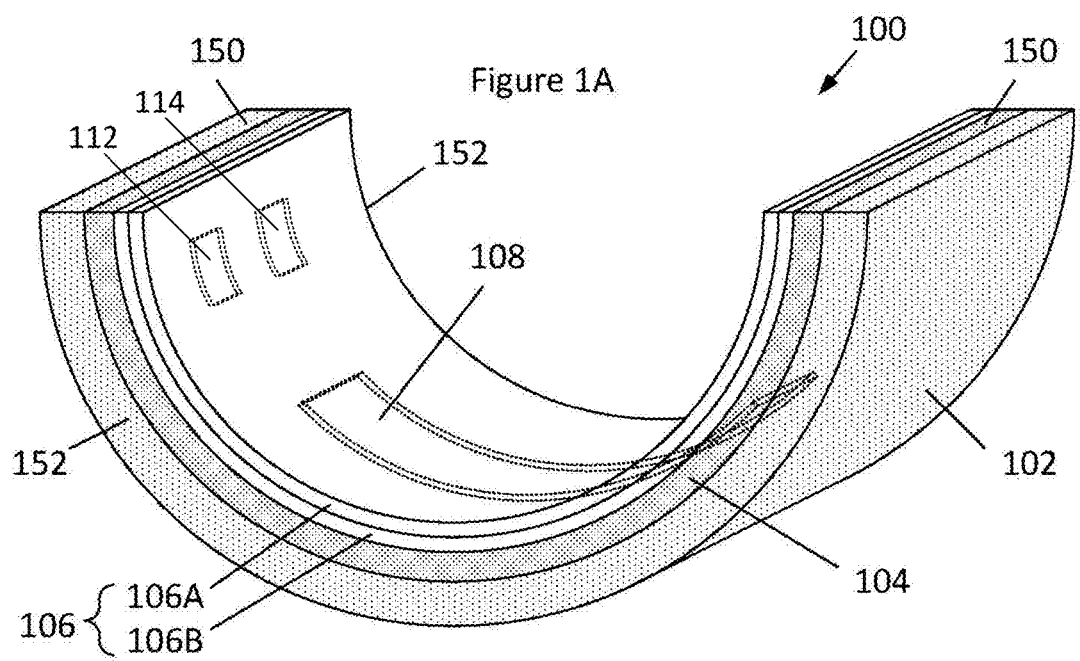
FIG. 1A shows a perspective view of a first bearing shell having a resistive element.
Figure 1B:
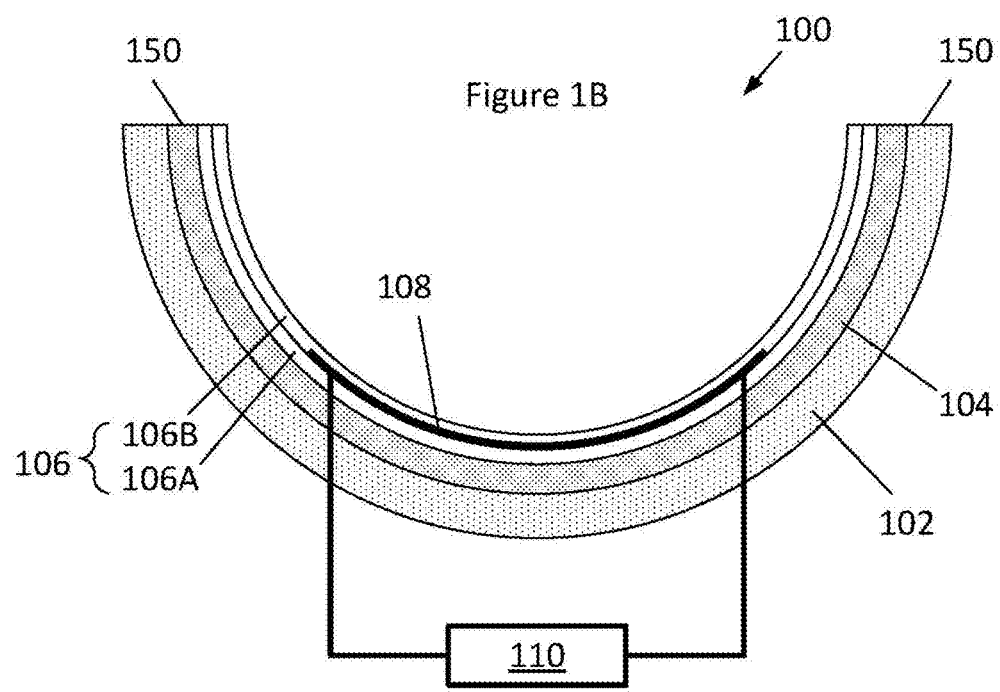
FIG. 1B shows a cross-sectional view of the bearing shell of FIG. 1A, perpendicular to the axis, and electrically connected to a monitoring module.
Figure 1C:
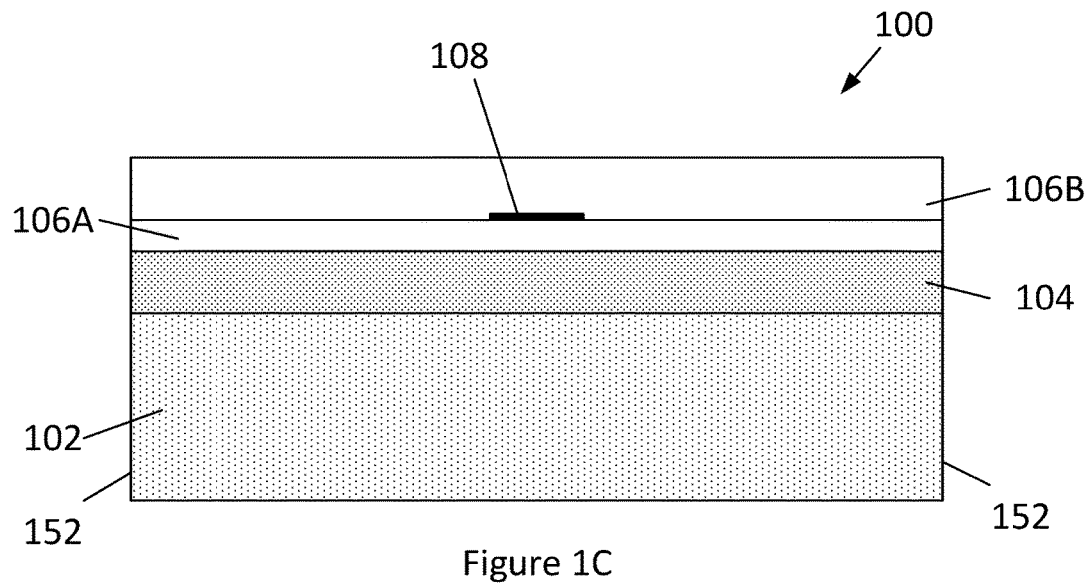
FIG. 1C shows a cross-sectional view of the bearing shell of FIG. 1A, through the crown of the bearing shell, parallel with the axis.

FIG. 1A schematically illustrates a bearing shell 100 (e.g. an exemplary sliding engine component) in the form of a hollow semi-cylindrical bearing shell, which is also commonly referred to as a "half bearing", and FIGS. 1B and 1C illustrate perpendicular cross-sectional views through the bearing shell.

The bearing shell 100 has composite plastic-polymer based overlay layer 106 on a substrate comprising a strong backing 102 of steel. The substrate may optionally comprise further layers 104 between the backing 102 and the composite overlay layer 106. A resistor 108 (being an exemplary electrical component) is embedded within the composite overlay layer 106.

The backing 102 provides strength and resistance to deformation of the bearing shell 100, when it is assembled in a main bearing housing or in a connecting rod big end bearing assembly, for example.

In the illustrated example, the optional lining layer 104 is a copper-based material (e.g. 35 copper-tin bronze), an aluminium-based material (e.g. aluminium or aluminium-tin alloy), or a polymer based layer, which is adhered to the steel backing 102.

The optional lining layer 104 provides suitable bearing running properties, if the overlay layer 106 should become worn through, for any reason.

The overlay 106 comprises a first overlay layer 106A deposited onto the substrate, and a second overlay layer 106B deposited onto the first overlay layer. At least the first overlay layer 106A is electrically insulating, and in the illustrated example, the second overlay layer 106B is also electrically insulating.

The overlay layer 106 provides a running surface (i.e. a sliding surface) over the lifetime of the bearing shell 100. In use, within an assembled bearing, the overlay layer 106 faces a rotating journal (e.g. a crankshaft journal) with which the bearing shell 100 mutually cooperates, with an intervening film of lubrication oil (not shown).

The overlay layer 106 is particularly suited to accommodating small misalignments between the bearing surface and the shaft journal (a property known as "conformability") and is able to receive and embed dirt particles circulating in the lubrication oil supply, so as to prevent scoring or damage to the journal surface by debris ("dirt embedability"). The overlay layer 106 also provides suitable tribological properties between the bearing shell 100 and the shaft journal, if a failure of the intervening oil film should occur.

The overlay layer 106 is commonly a composite layer comprising a matrix of plastic polymer material, throughout which functional particulate is distributed. For example, as described in WO2010066396, the overlay layer 106 may comprise solid lubricant and hard particulate. In the illustrated example, the plastic polymer matrix material in the overlay layer 106 is a polyamide-imide resin.

During manufacture, the resistor 108 is formed on the first overlay layer 106A before the second overlay layer 106B is deposited. The resistor 108 is electrically isolated from the substrate 102 by the first overlay layer 106A. The resistor 108 comprises a strip of electrically resistive coating that extends generally circumferentially along the bearing shell 100, extending towards the joint faces 150, and located equidistantly between the axial faces 152.

Figure 1D:
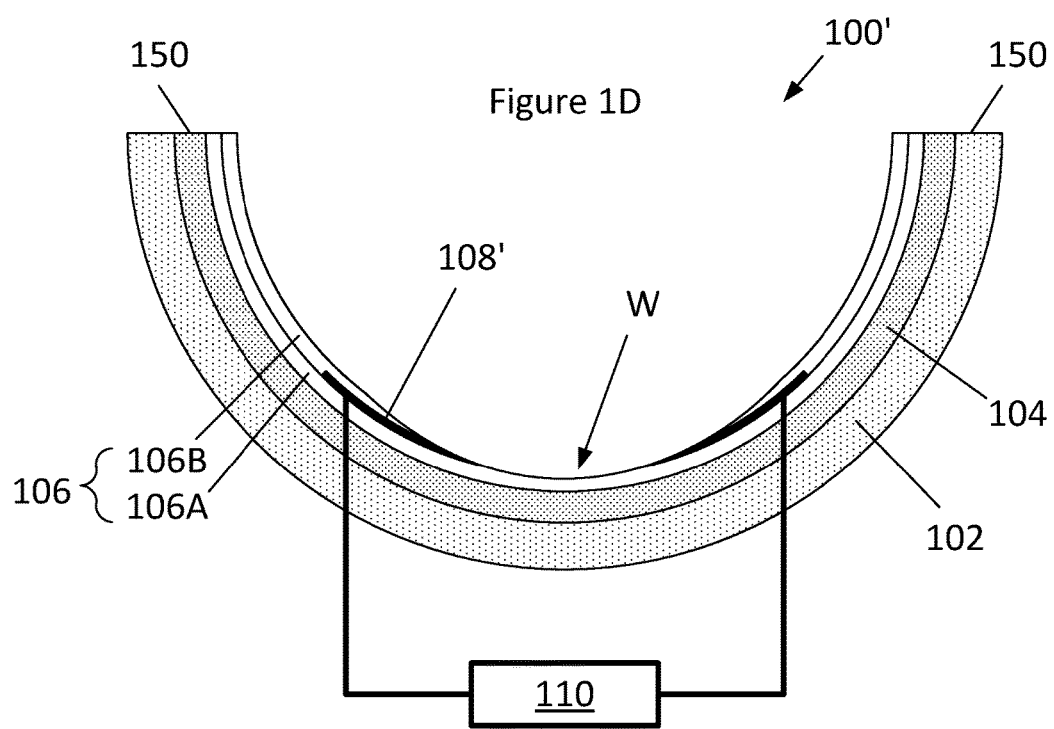
FIG. 1D shows the bearing shell of FIG. 1B, after the bearing shell has been subject to preferential wear at the crown of the bearing shell.

FIG. 1B schematically illustrates the bearing shell 100 with the resistor 108 electrically connected to a monitoring module 110. In use, the monitoring module 110 measures the resistance of the resistor 108. Once the overlying second overlay layer 106B has been worn away, the resistor 108 will commence being worn away, during further use. From the measured electrical resistance of the resistor 108, the monitoring module 110 may determine whether a part of resistor 108 has been completely worn away W, as shown in FIG. 1D, breaking the continuity of the electrical circuit. Advantageously, the monitoring module 110 may operate an alarm and/or deactivate the operation of the engine, if it detects that the second overlay layer 106B should have become worn through.

Further, in the case that the resistor 108 is thick, the electrical resistance of the resistor changes as it becomes worn. Advantageously, monitoring the electrical resistance of the resistor 108 enables the level of wear of the overlay 106 to be determined with greater sensitivity, enabling different levels of alarm to be provided by the monitoring module (e.g. yellow and red warning alarms) corresponding to different levels of wear of the overlay.

The resistor 108 may be a resistance temperature detector element (e.g. comprising a strip of platinum, nickel or copper), having an electrical resistance that varies in correspondence with its temperature. By measuring the resistance of the resistor 108 (and potentially with reference to a previously measured calibration resistance), the monitoring module may determine the temperature of the bearing shell 100. Advantageously, the monitoring module 110 may operate an alarm and/or deactivate the operation of the engine, if the bearing shell should become overheated.

Figure 1E:
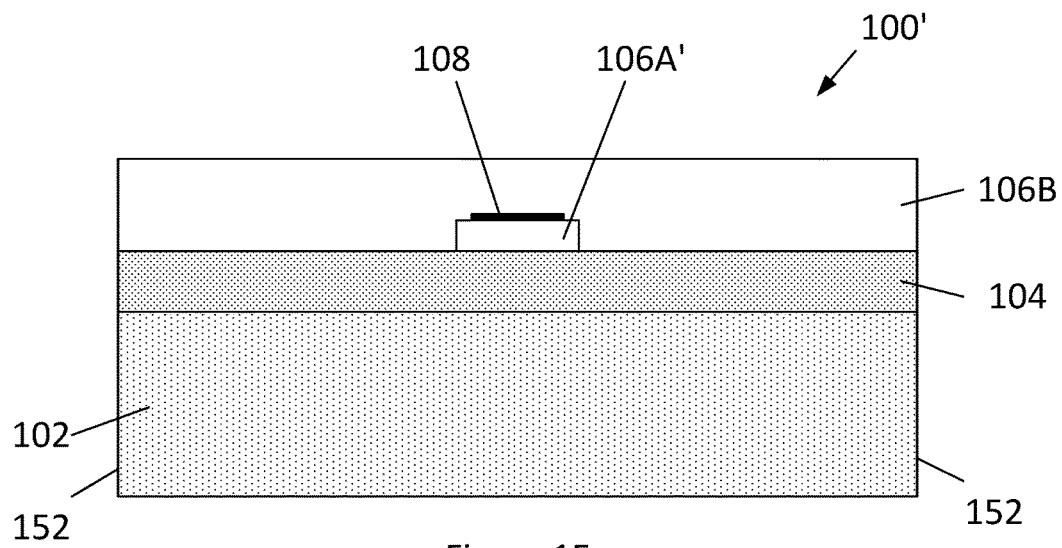
FIG. 1E shows a cross-sectional view of a bearing shell that is a variant of the bearing shell of FIG. 1A, through the crown of the bearing shell, parallel with the axis.

FIGS. 1A to 1D show a bearing shell 100 in which an electrically insulating first overlay layer 106A has been provided across the entire surface of the substrate 102, 104. However, alternatively, the first overlay layer 106A' may be patterned in correspondence with the electrical component 108, as illustrated on the bearing shell 100' in FIG. 1E. Advantageously, this could provide a reduced manufacturing cost for the sliding bearing (e.g. bearing shell 100').

Although FIG. 1A illustrates a resistor 108 by way of an exemplary electrical component, alternative or additional electrical components may be provided, as is described below. For example, the bearing shell may be provided with a strip of highly conductive electrically tracking continuity monitoring element 112 (e.g. a strip patterned from a metal coating), for detecting a break in electrical continuity caused by wear. In a further alternative, the bearing shell may be provided with a thermocouple 114 (e.g. bimetallic element) for sensing the temperature of the bearing. In a yet further alternative, the electrical component may function as a strain sensor (strain gauge).

In addition to the illustrated layers, an adhesion promoter may also be deposited (e.g. by spraying, or applied by a physical vapour deposition process, a flame pyrolysis process, or by a plasma process) before and/or after the deposition of the electrical component to reduce any risk of delamination of the electrical component from the overlay layers. An exemplary adhesion promoter is a silane material, e.g. gamma-aminopropyltriethoxysilane (e.g. 3-aminopropyltriethoxysilane), or bis-(gamma-trimethoxysilpropyl) amine.

Further, the surface of the substrate may be roughened (e.g. by grit-blasting or by chemical etching) before deposition of the first electrically insulating layer to enhance adhesion to the substrate.

The electrical component is formed on the first overlay layer, which is electrically insulating, and isolates the electrical component from electrical conduction to the substrate. The electrical component may comprise a patterned layer of ink. The ink may be a dispersion of metallic particles (e.g. gold, silver or copper) for a conductive layer (e.g. electrical tracking), carbon particles for a resistive layer, or semiconducting particles for a semiconducting layer. Alternative particulate dispersions may comprise metal oxides, or silver based compounds, including silver neodecanoate. Chloride inks may also be used. Further, the electrical component may comprise a patterned layer of dielectric ink for a dielectric layer. The electrical component may comprise a layer with conductive ceramic particulate material, e.g. conductive metal oxide (e.g. ZnO, InO, ITO, {indium tin oxide}), or graphene oxide. Alternatively, the electrical component may comprise an organic semiconductor material.

The patterned layer or layers of the electrical component may be patterned by a photolithographic process. The patterned layer may have a thickness of 10 nm or more (where thickness refers to the direction perpendicular to the sliding surface of the bearing).

Alternatively to patterning a deposited layer, the electrical component may be deposited by printing, or by the adhesion of an electrical component formed on a tape substrate, or another pre-printed electrical insert. The electrical component may be deposited onto a curved surface, e.g. the electrically insulating first overlay layer of a curved bearing shell. For example, the pre-printed electrical insert may be a flexible substrate having a surface coated with adhesive, which may be applied to the substrate as an adhesive tape. Alternatively, the electrical component may be printed or otherwise formed on a flat blank, before it is curved to shape.

The overlay layer is commonly deposited as a layer of polymer suspended in a solvent, and the solvent is removed during a thermal curing stage. The electrical component may be deposited as an insert in which electrical tracking is provided on an electrical substrate that is soluble in the polymer solvent, and the electrical substrate may dissolve into the material of the overlay layer, before the overlay is cured.

Figure 2:
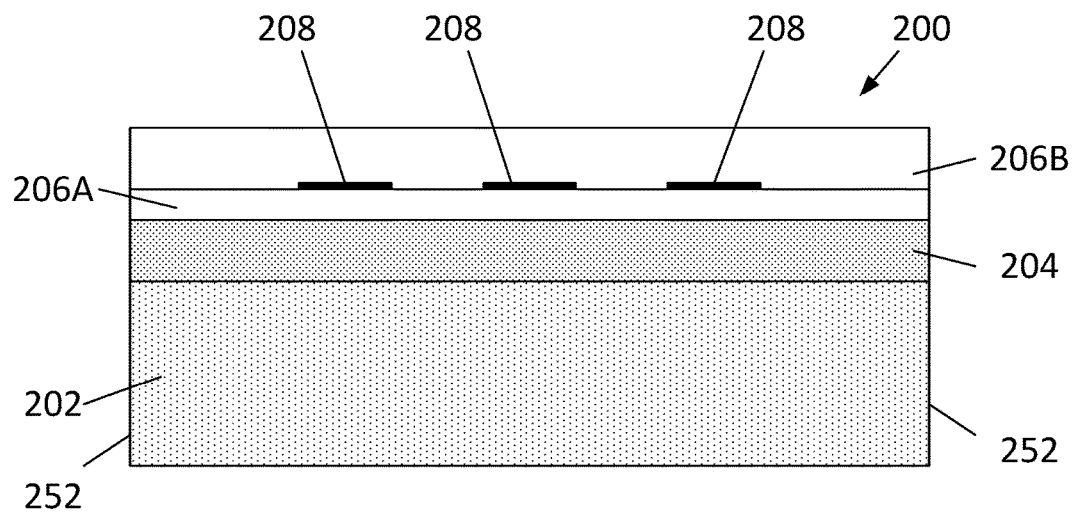
FIG. 2 shows a cross-sectional view through the crown of a second bearing shell, parallel with the axis, having three axially spaced resistive elements.

Although the bearing shell of FIG. 1A to 1C only has a single electrical component (resistor 208), the bearing shell may alternatively be provided with a plurality of similar electrical components at different locations. FIG. 2 shows a second bearing shell 200 having three resistive elements 208 that are axially spaced apart across the width of the bearing shell, between the axial end faces 252. Advantageously, the provision of a plurality of electrical components enables the sensing of wear in different parts of the bearing shell, which may detect wear that is inhomogeneous along the axial extent of the bearing shell. Further, a monitoring system may set an alarm threshold that is dependent upon the breaking of electrical continuity (or otherwise detecting wear) in more than one place, to avoid false alarms caused by scarring or scuffing of the resistor (or other electrical component) by particulate from the lubrication oil, e.g. by the embedding of a particle into the overlay, which pierces through the resistor.

Figure 3A:
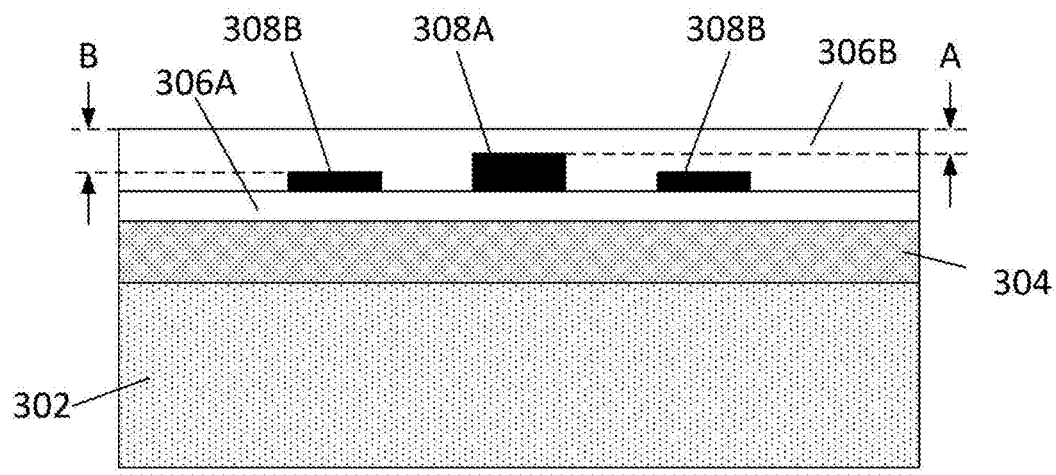
FIG. 3A shows a cross-sectional view of a bearing shell having axially spaced resistive elements of different thicknesses, viewed through the crown of the bearing shell, parallel with the axis.
Figure 3B:
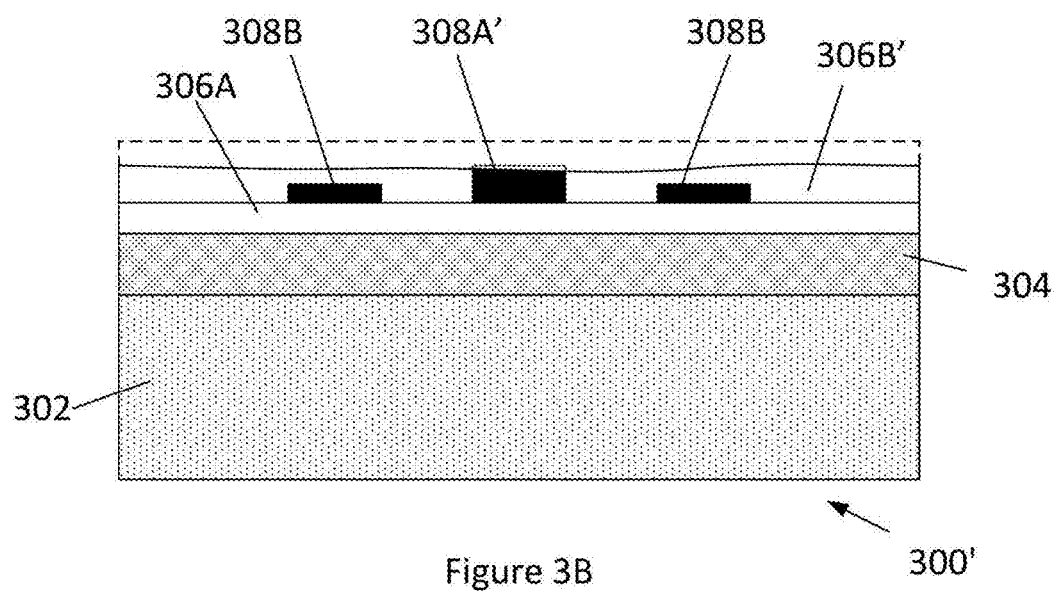
FIG. 3B shows the bearing shell of FIG. 3A after it has become worn in use.

The bearing shell 300 of FIG. 3A differs from that of FIG. 2 by the provision of a plurality of resistors 308A and 308B having different thicknesses, which are deposited on a common layer, e.g. the first overlay layer 306A. Wear of the thicker resistor 308A may commence after a thickness A of the second overlay layer 306B has been worn away immediately above, whilst wear of the thinner resistors 308B may not commence until a great thickness B of the second overlay layer has been worn away. FIG. 3B shows an intermediary stage in the wear of the bearing shell 300, in which the wear of the thicker resistor 308A has commenced and wear of the thinner resistors 308B has not yet commenced. Advantageously, the use of electrical components of different thicknesses enables detection of different levels of wear of the sliding bearing, and may enables different levels of alarm to be provided by the monitoring module (e.g. yellow and red warning alarms).

Figure 3C:
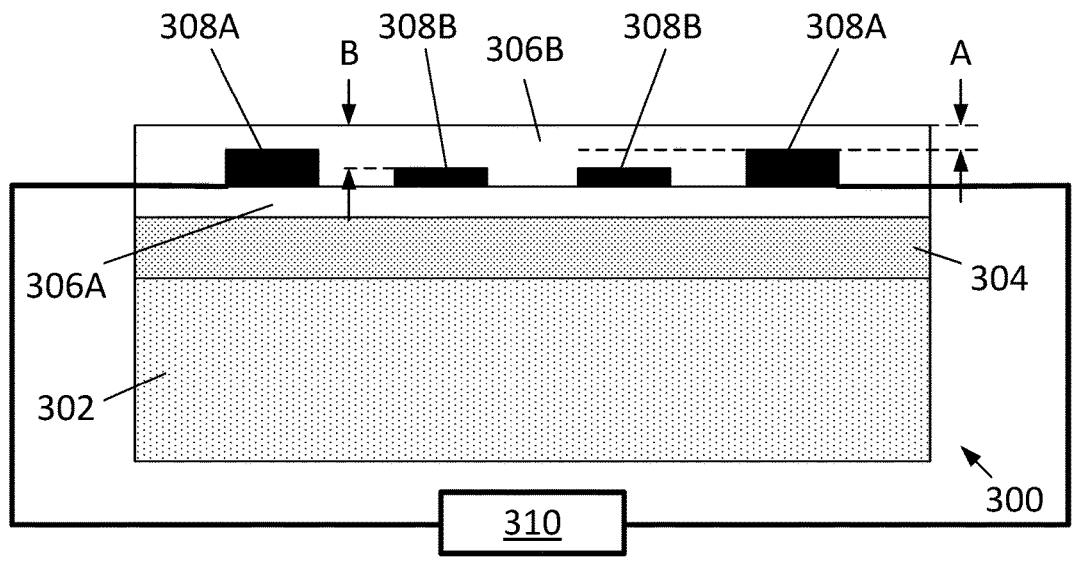
FIG. 3C shows a variant upon the bearing shell of FIG. 3A.

In use, wear may alternatively be detected by detecting electrical conduction through the lubrication oil in the bearing assembly, between different pads that have become exposed once the overlying overlay has been worn away, as shown in FIG. 3C.

Figure 3D:
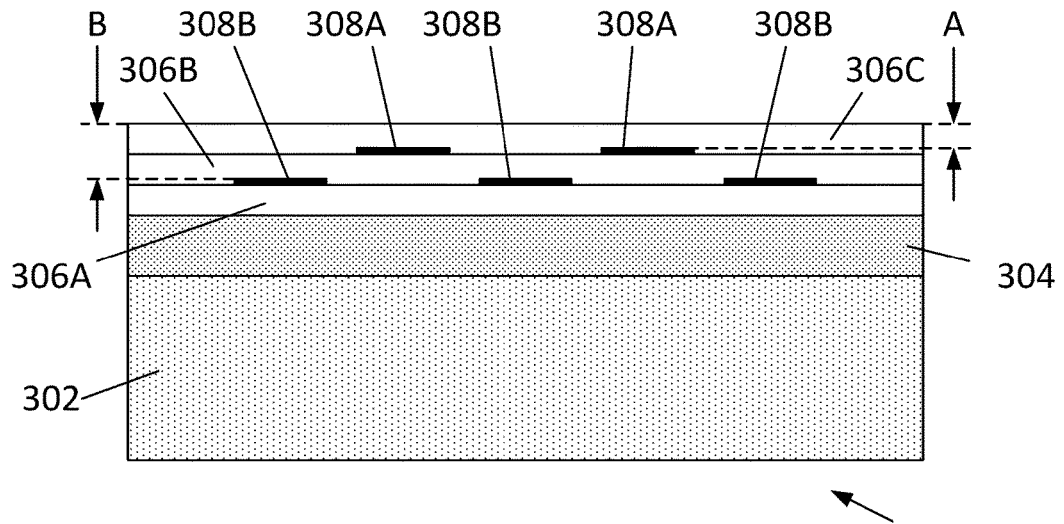
FIG. 3D shows a further variant upon the bearing shell of FIG. 3A.
Figure 4:
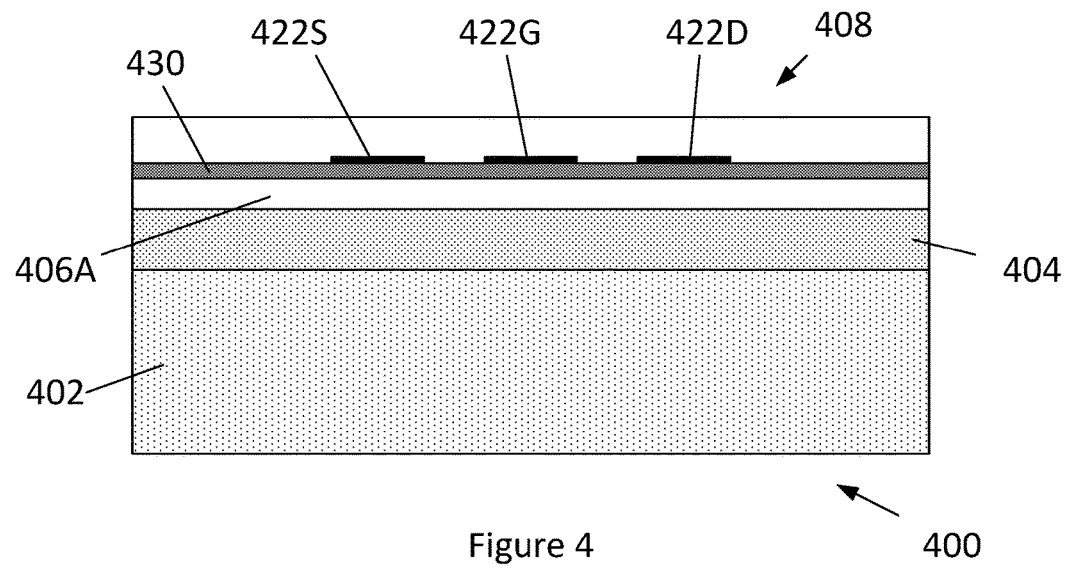
FIG. 4 shows a cross-sectional view of a bearing shell having a transistor, viewed through the crown of the bearing shell, parallel with the axis.

Rather than a plurality of electrical components of different thicknesses that are deposited on a common layer, electrical components 308A and 308B (e.g. thin resistors or electrical tracking) may be deposited on different layers 306A and 306B, at different heights, with respect to the layers deposited on the substrate, as shown in FIG. 3D. Advantageously this enables the detection of different levels of wear. For example, the overlay may comprise three overlay layers, with some electrical components being deposited between the first and second overlay layers, and with other electrical components being deposited between the second and third overlay layers.

The bearing shell 400 may be provided with a transistor 408, formed with a semiconducting layer 430 deposited between the first and second overlay layers 406A and 406B, with a gate electrode 422G that controls the electrical conductivity of an underlying active region electrically connecting between a source electrode 422S and a drain electrode 422D formed on (or in) the semiconductor layer. The semiconductor layer may comprise a printable organic semiconductor material, for example: a poly(thiopene) like poly(3-hexylthiophene) (P3HT) and poly(9,9-dioctylfluorene co-bithiophen) (F8T2), poly(3,4-ethylene dioxitiophene), doped with poly(styrene sulfonate), (PEDOT:PSS) and poly(aniline) (PAM).

Figure 5A:
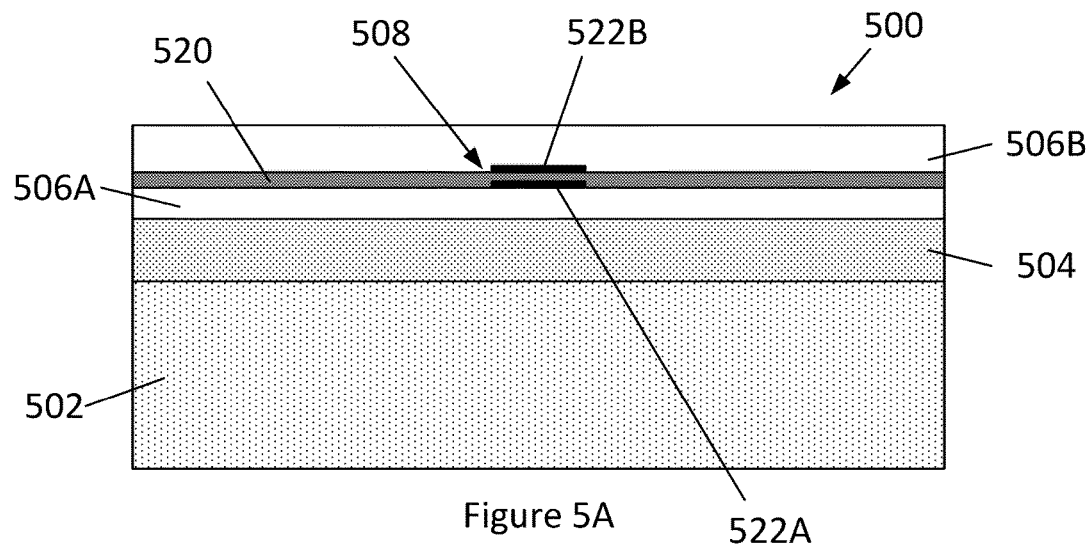
FIG. 5A shows a cross-sectional view of a bearing shell having a capacitive element, viewed through the crown of the bearing shell, parallel with the axis.
Figure 5B:
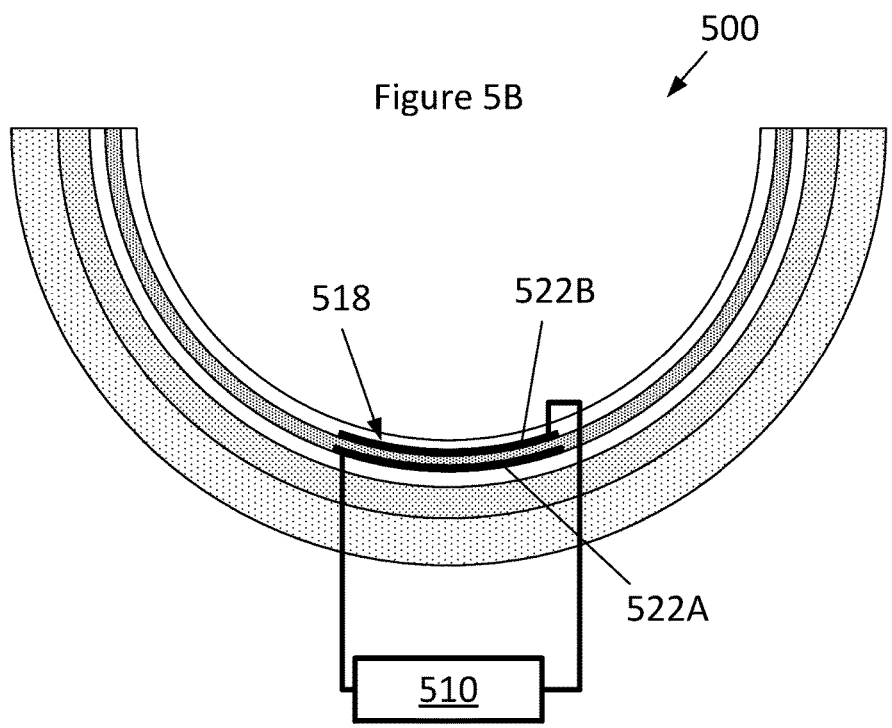
FIG. 5B shows a cross-sectional view of the bearing shell of FIG. 5A, perpendicular to the axis, and electrically connected to a monitoring module.

FIGS. 5A and 5B show a bearing shell 500 having a capacitive element 508 located at the crown of the bearing shell (i.e. mid-way between the joint faces). The bearing shell 500 comprises a dielectric layer 520 deposited between the first and second overlay layers 506A and 506B, with the capacitive element 508 being formed by electrical pads 522A and 522B respectively deposited below and above the dielectric layer. Advantageously the dielectric layer 520 may be compressible under the high pressure arising in a bearing assembly, in use, causing the capacitance of the capacitive element 508 to vary in correspondence with the localised pressure, providing a pressure sensor. The monitoring module 510 is configured to monitor the capacitance of the capacitive element 508 and determine the pressure. The capacitance may be monitored throughout the rotation of the journal (e.g. a crankshaft journal within a crankshaft bearing assembly). Additionally, the bearing assembly may be monitored when not in use, e.g. in an engine bearing assembly when the engine is not running, or is just starting up.

Commonly in crankshaft bearing assemblies, the bearing shells are orientated for the highest load (arising during the firing of the corresponding piston) to occur at the crown of the bearing shell (mid-way between the circumferential ends of the bearing shell, known as the joint faces), and in such a bearing assembly, the electrical component may be provided at the crown of the bearing shell, to enable monitoring of the region of highest load. However, in other bearing assemblies, such as connecting rod bearing assemblies, the bearing shells may be mounted obliquely, with the peak loads arising away from the bearing shell crown, and the electrical component may be provided in a corresponding location, again to enable monitoring of the region of highest load.

Figure 6A:
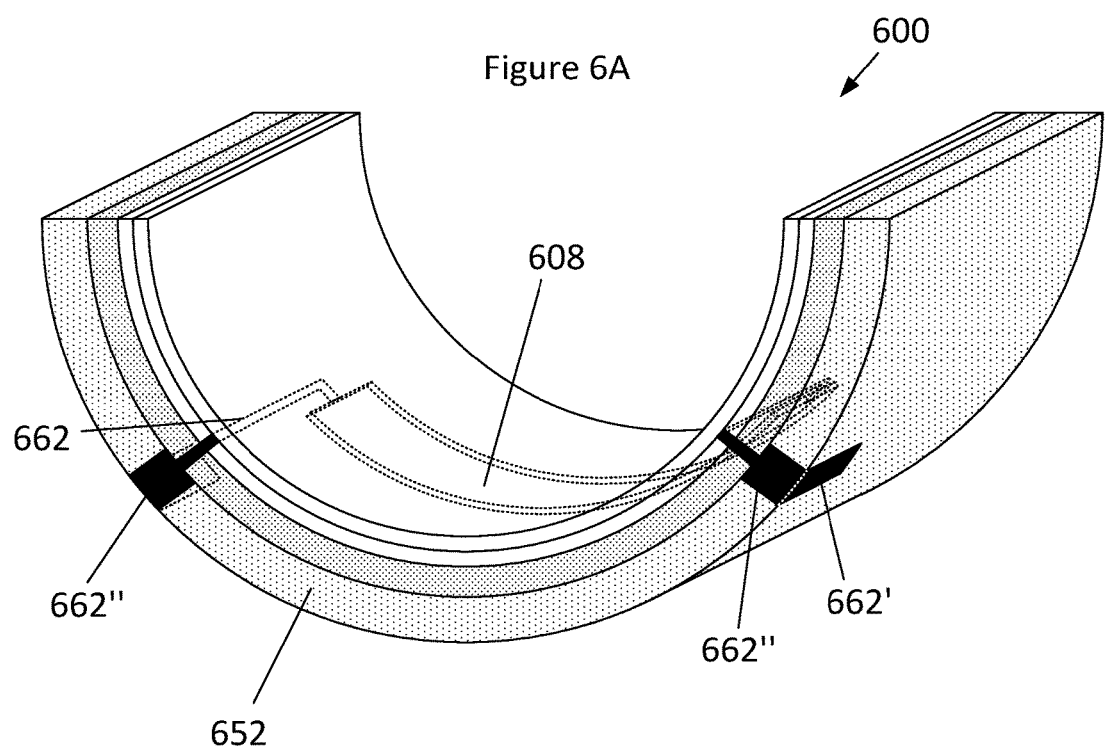
FIG. 6A shows a bearing shell similar to that of FIG. 1A, with additional tracking that extends from the resistor to an axial face.
Figure 6B:
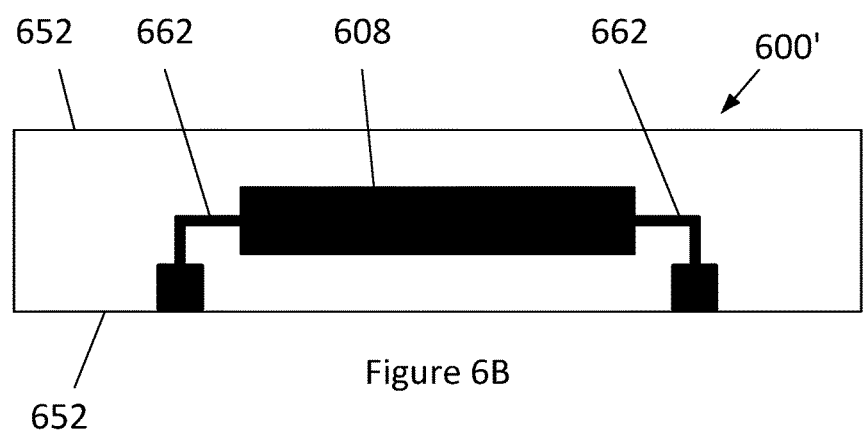
FIG. 6B shows a plan view of a blank for the bearing shell of FIG. 6A.

FIG. 6A shows a bearing shell similar to that of FIG. 1A, in which electrical tracking 662 extends to an axial face 652 of the bearing shell, where further electrical tracking 662" is provided with electrical contact pads, which also (optionally) extend around onto the opposite side of the substrate from the overlay, where further electrical contact pads 662' may be provided, e.g. the concave outer face of the bearing shell 600. FIG. 6B shows a plan view of a flat blank for forming the bearing shell 600 of FIG. 6A.

Crankshaft bearing assemblies commonly comprise a pair of bearing shells in which the more lightly loaded bearing shell (in use) is provided with a circumferential oil distribution groove and an oil supply hole connecting to the groove for distribution of lubrication oil from an oil supply gallery in the corresponding housing, and the more heavily loaded bearing shell is formed without a circumferential oil distribution groove and an oil supply hole. An electrical component may be provided in the loaded bearing shell, which is more vulnerable to wear and damage. However, should an electrical component be provided in a bearing shell with an oil distribution groove, the electrical component may be provided to the side (or both sides) of the groove.

Figure 7:
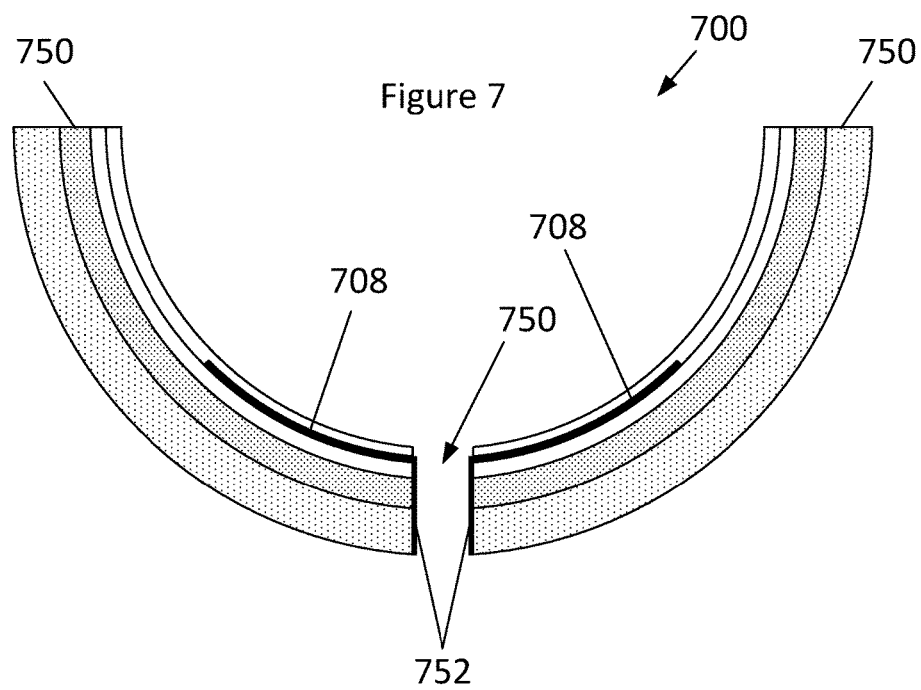
FIG. 7 shows a cross-sectional view of a bearing shell, perpendicular to the axis, with electrical tracking passing along an oil supply hole at the crown of the bearing shell.

In the case that the bearing shell 700 is provided with an oil supply hole 750, electrical tracking 752 (or a pre-formed connector) may extend through the oil supply hole from the electrical component 708, for electrically contacting to the electrical component 708 from the outside of the bearing shell (e.g. contacting from electrodes provided in the housing for the bearing shell), as shown in FIG. 7. Advantageously, extending the electrical contacts through the oil supply hole may enable electrical contact to the electrical component without further modification to the bearing shell.

Figure 8A:
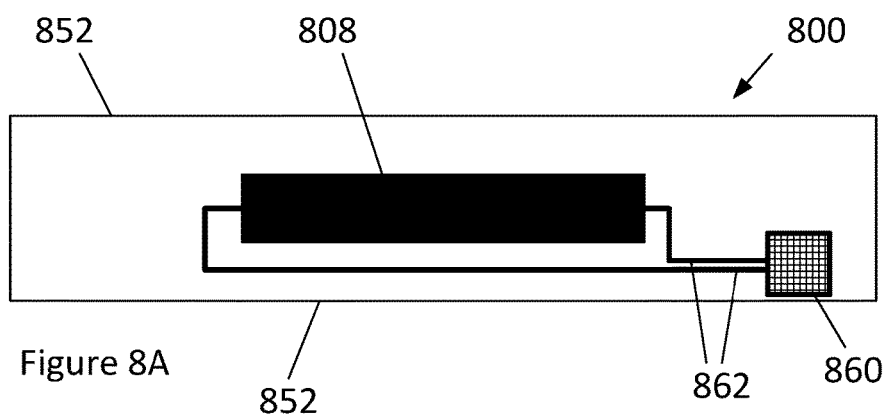
FIGS. 8A and 8B show plan views of blanks for a bearing shell in which a resistive element is electrically connected to an RFID tag respectively provided on the inside and outside surfaces of the bearing shell.
Figure 8B:
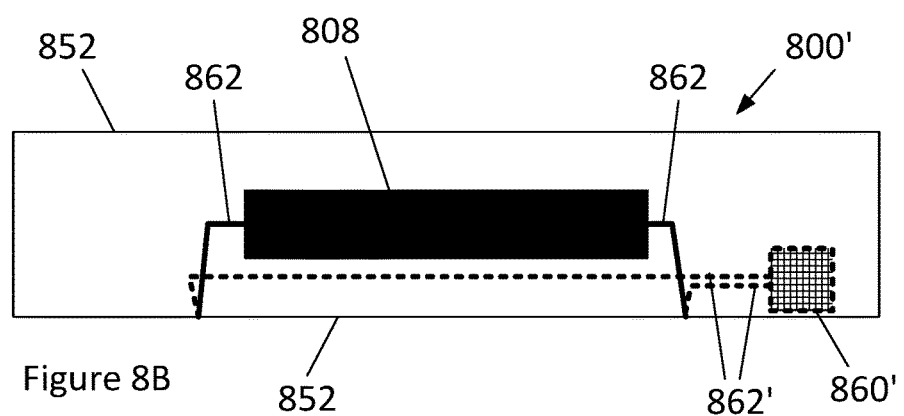

Rather than being directly electrically contacted, the electrical component may be electrically connected to a radio-frequency identification tag (RFID tag) comprising an antenna, and the monitoring module may comprise a further antenna in the housing of the corresponding bearing assembly, which communicates wirelessly with the electrical component. FIGS. 8A and 8B show flat blanks 800 and 800' for forming into bearing shells. FIG. 8A shows a bearing shell blank 800 in which electrical tracking 862 connects the electrical component to an RFID tag 860, e.g. the electrical tracking and RFID tag are deposited onto the same layer as the electrical component, which advantageously simplifies manufacture. Alternatively, FIG. 8B shows a bearing shell blank 800' in which the RFID tag 860' is provided on the opposite side of the substrate from the sliding surface, with electrical tracking 862 and 862' extending from the electrical component, around an axial face of the bearing shell blank, and to the back of the substrate. Advantageously, providing the RFID tag on the opposite side of the bearing shell from the sliding bearing protects it from the risk of abrasive damage by the journal and reduces its exposure to particulate carried in the intervening lubrication oil. The RFID tag 860 and 860' may be provided in a recess, to protect it from physical damage when the bearing shell is in use.

In addition to receiving data from the RFID tag on the bearing shell, the monitoring module may also supply operating power wirelessly to the RFID tag on the bearing shell. Alternatively, the bearing shell may comprise micro-generators for locally generating power from mechanical energy, e.g. generating power from mechanical vibrations in the bearing shell.

Although illustrated by bearing shells, alternative sliding bearings may be provided with electrical components, e.g. including thrust washers or bearing shell flanges.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding bearing comprising:
   a metallic substrate;
   a first electrically insulating layer on the metallic substrate;
   an overlaying electrically insulating layer on the first electrically insulating layer;
   a plurality of electrical components axially spaced apart along the first electrically insulating layer with respect to a rotation axis;
   wherein each electrical component extends circumferentially at least partially around the metallic substrate;
   wherein at least one electrical component of the plurality of electrical components comprises a plurality of electrically isolated conductive pads disposed between the first electrically insulating layer and the overlaying electrically insulating layer; and
   wherein the plurality of electrically isolated conductive pads includes at least two pads of different thickness that are configured to become exposed after different levels of wear of the overlaying electrically insulating layer proximate to each pad.

2. A sliding bearing according to claim 1, wherein the plurality of electrical components comprises a resistor.

3. A sliding bearing according to claim 2, wherein the resistor is a resistance temperature detector and includes an electrical element of at least one of platinum, nickel and copper.

4. A sliding bearing according to claim 2, wherein the plurality of electrical components comprises a thermocouple.

5. A sliding bearing according to claim 1, wherein the plurality of electrical components comprises a continuity monitoring element.

6. A sliding bearing according to claim 1, wherein the plurality of electrical components comprises a dielectric material on the first electrically insulating layer between the first electrically insulating layer and the overlaying electrically insulating layer.

7. A sliding bearing according to claim 1, wherein the plurality of electrical components comprises a capacitor.

8. A sliding bearing according to claim 1, wherein the plurality of electrical components comprises at least one of a pressure sensor and a strain sensor.

9. A sliding bearing according to claim 1, wherein the plurality of electrical components comprises a semiconductor material on the first electrically insulating layer.

10. A sliding bearing according to claim 1, wherein the plurality of electrical components comprises a transistor.

11. A sliding bearing according to claim 10, wherein the plurality of electrical components further includes a semiconductor layer disposed on the first electrically insulating layer, and wherein the transistor includes a source electrode and a drain electrode disposed at least one of in and on the semiconductor layer, and a gate electrode on an active region between the source electrode and the drain electrode.

12. A sliding bearing according to claim 1, wherein the plurality of electrical components includes at least two pads of the same thickness that are configured to become exposed after corresponding levels of wear of the overlaying electrically insulating layer proximate to each pad.

13. A sliding bearing according to claim 1, further comprising a radio-frequency identification tag electrically connected to a first electrical component of the plurality of electrical components.

14. A sliding bearing according to claim 1, further comprising an adhesion promoter disposed between the plurality of electrical components and the first electrically insulating layer.

15. A sliding bearing according to claim 1, wherein the sliding bearing comprises at least one of a bearing shell, a thrust washer, a bearing bush and a bearing shell flange.

16. A sliding bearing monitoring system, comprising:
   a sliding bearing including a metallic substrate, a first electrically insulating layer on the metallic substrate, an overlaying electrically insulating layer on the first electrically insulating layer, and an electrical component comprising a plurality of electrically isolated conductive pads disposed between the first electrically insulating layer and the overlaying electrically insulating layer, wherein the plurality of electrically isolated conductive pads includes at least two pads of different thickness disposed on the first electrically insulating layer that are configured to become exposed after different levels of wear of the overlaying electrically insulating layer proximate to each pad; and
   a monitoring module operatively connected to the sliding bearing and configured to monitor the electrical component, the monitoring module further configured to at least one of operate an alarm and deactivate the operation of an engine within which the sliding bearing is housed in response to a measurement signal of the electrical component.

17. A method of manufacturing a sliding bearing comprising:
   providing a metallic substrate;
   forming a first electrically insulating layer on the metallic substrate;
   depositing an electrical component on the first electrically insulating layer;
   forming a second electrically insulating layer on the first electrically insulating layer and on the electrical component;
   wherein depositing the electrical component comprises depositing a plurality of electrically isolated conductive pads on the first electrically insulating layer; and
   wherein depositing a plurality of electrically isolated conductive pads comprises depositing at least two pads of different thickness on the first electrically insulating layer that are configured to become exposed after different levels of wear of the second electrically insulating layer proximate to each pad.

18. A method according to claim 17, wherein depositing the electrical component includes a printing technique.

19. A method according to claim 17, wherein depositing the electrical component includes adhering a flexible electronic insert onto the at least one first electrically insulating layer.

* * * * *